US006826696B1

(12) United States Patent
Chawla et al.

(10) Patent No.: US 6,826,696 B1
(45) Date of Patent: Nov. 30, 2004

(54) SYSTEM AND METHOD FOR ENABLING SINGLE SIGN-ON FOR NETWORKED APPLICATIONS

(75) Inventors: Rajeev Chawla, Union City, CA (US); Fel Bautista, Danville, CA (US); Marco Framba, Cupertino, CA (US); Venky Talla, Fremont, CA (US); Rajdeep Gupta, Alameda, CA (US)

(73) Assignee: WebMD, Inc., Elmwood Park, NJ (US)

( * ) Notice: Subject to any disclaimer, the term of this patent is extended or adjusted under 35 U.S.C. 154(b) by 764 days.

(21) Appl. No.: 09/626,340

(22) Filed: Jul. 26, 2000

Related U.S. Application Data

(60) Provisional application No. 60/158,940, filed on Oct. 12, 1999.

(51) Int. Cl.[7] ................................................. H04L 9/00
(52) U.S. Cl. ........................ 713/201; 713/202; 713/168
(58) Field of Search ................................. 713/168, 201, 713/202

(56) References Cited

U.S. PATENT DOCUMENTS

| | | | |
|---|---|---|---|
| 5,241,594 A | | 8/1993 | Kung |
| 5,301,105 A | | 4/1994 | Cummings, Jr. |
| 5,684,950 A | | 11/1997 | Dare et al. |
| 5,790,785 A | | 8/1998 | Klug et al. |
| 5,818,936 A | | 10/1998 | Mashayekhi |
| 5,892,828 A | | 4/1999 | Perlman |
| 6,163,844 A | * | 12/2000 | Duncan et al. ............. 713/201 |
| 6,343,323 B1 | * | 1/2002 | Kalpio et al. ............... 709/229 |
| 6,611,861 B1 | * | 8/2003 | Schairer et al. ............. 709/217 |
| 6,654,796 B1 | * | 11/2003 | Slater et al. ................. 709/220 |
| 6,654,807 B2 | * | 11/2003 | Farber et al. ............... 709/225 |

OTHER PUBLICATIONS

Jani Hursti, Helsinki University of Technology, "Single sign–On", dated Nov. 19, 1997.
Robert E. Lee, "Security made simple—is single sign–on the answer?", Apr. 1997 edition of Sun World.
Overview of "Microsoft Passport".

* cited by examiner

Primary Examiner—Kambiz Zand
(74) Attorney, Agent, or Firm—Jones Day

(57) ABSTRACT

A system and method for performing single sign-on authentication for networked applications. A system for integrating networked applications via an application shell is described. In response to a user utilizing a client program to access a master server and provide the master server with information identifying the user, the master server returns code usable by the client program for running the application shell. The application shell may be operable to intercept user attempts to launch an application from the application shell environment and may in response determine invocation parameters to send to the application, which the application can use to automatically authenticate the user.

30 Claims, 10 Drawing Sheets

FIG. 6

User:

| | | |
|---|---|---|
| Last: [          ] | | ⊙ Male  ○ Female |
| First: [          ] | Username: [          ] |
| Middle: [          ] | Password: [          ] |
| Job: [          ▼] | User State: ⊙ Active  ○ Inactive |

Locations: [Office ▼]  [Delete Location]

☑ Set as Default

| | |
|---|---|
| Email: [          ] | Address: [          ] |
| Phone: [          ] | [          ] |
| FAX: [          ] | City: [          ] |
| Pager: [          ] | State: [  ▼]  ZIP: [    ] |
| Pager Email: [          ] | [Domain Properties] |

[Save] [Clear]

Personalization - Services

Services | Messages | Change Password

[Save Changes] [Undo Changes]

Navigation Bar Services

Group name: [SomeGroup ▼]

Services:
- ☑ Change Password
- ☑ Check Eligibility
- ☑ New Referrals
- ☑ Check Referrals
- ☑ Check Claims
- ☑ Send Claims
- ☑ Get Reports Instructions
The services you select will app∎ bar (the blue bar on the left side ∎ window)

When you are done making char Changes' button below, or click 'l restore the previous settings.

Any changes you make will be re the navigation bar is refreshed.

FIG. 7

SYSTEM AND METHOD FOR ENABLING SINGLE SIGN-ON FOR NETWORKED APPLICATIONS

PRIORITY CLAIM

This application claims benefit of priority of U.S. provisional application Ser. No. 60/158,940 titled "System and Method for Enabling Single Sign-On for Networked Applications" filed Oct. 12, 1999, whose inventors were Fel Bautista, Steve Lemon, and Rajeev Chawla.

FIELD OF THE INVENTION

The present invention relates to the field of networked applications, and more particularly to user authentication for networked applications.

DESCRIPTION OF THE RELATED ART

Authentication and authorization are two basic computer security concepts. In general, authentication refers to verifying the identity of a user attempting to gain access to a computing resource or system, and authorization refers to granting an authenticated user permission to access the resource or system, at least to a degree. There are many methods and protocols for performing authentication, each with various advantages and disadvantages. For example, authentication may be performed using cleartext password methods, hashed password methods, challenge-response methods, or any of many other types of methods.

One common denominator of authentication methods is that they require the user to provide some type of information or perform some action. For example, a user may be required to provide a password, provide biological data such as a retinal scan, provide personal data such as a handwriting sample, provide a number computed based on a synchronized clock in the user's possession, etc. Of course, what then occurs with the provided information varies for different authentication protocols. For example, the user's password may be sent to the system in encrypted form, the user's password may be used as a variable in a mathematical function to compute a value which is then sent to the system, etc.

One major problem which users face is that as they attempt to interact with multiple systems or multiple resources within a system, they are often required to provide authentication information multiple times. This imposes practical problems to users, such as having to remember or store multiple passwords, having to have a synchronized clock currently in their possession, etc., as well as the frustrating workflow problems of being interrupted to type in a password, etc. A concept known as "single sign-on" aims to address these types of problems. The idea behind single sign-on is that a user is authenticated once, in response to providing information or performing an action as described above, and then further authentication procedures are performed transparently to the user as he attempts to access other systems or resources.

The issue of authentication may, of course, be considered at many different levels. For example, authentication may be considered at a system level, such as when a system such as a Windows NT or Unix system verifies that a user attempting to logon has a valid user account and has provided a valid password. Authentication may also be considered at a system resource level. For example, an application which a user attempts to launch may authenticate the user, or an application may authenticate the user when he attempts to open a particular file, etc. In the case of application-level authentication, the application may utilize a protocol or method of its own, and/or authentication data of its own, to perform the authentication process, or the application may rely on system-level authentication services or protocols for authenticating the user.

Most efforts to enable single sign-on have approached the problem by attempting to incorporate system-level authentication services or protocols into the computing environments in question. Kerberos is one well-known example of this type of approach. In the Kerberos approach, a user provides authentication information to a Kerberos server. In response, the Kerberos server grants the user a ticket-granting ticket. The user may then present this ticket-granting ticket to a ticket-granting server in order to get a server ticket. This server ticket may then be used to access resources such as applications. Other attempts to enable single sign-on by building it into the system level include IBM Corporation's KryptoKnight and Axent Technologies Inc.'s Enterprise Resource Manager.

Such approaches to single sign-on generally aim to provide a comprehensive, very secure authentication infrastructure able to provide system-wide authentication services for applications and other resources. While this may seem ideal, there are several disadvantages involved. For example, in order to introduce this type of single sign-on capability to an existing system, the system may have to be modified significantly. For example, the Kerberos approach may require the Kerberos server, the ticket-granting server, etc. to be set up. Additionally, user machines may need to be modified with special client-side software for the system's authentication protocol. Once the necessary modifications have been made to a system, there is the problem of how to define the authentication logic for the system. For example, many systems comprise multiple servers in different locations. System administrators must decide which of these servers the single sign-on policy applies to, which users the policy applies to, etc.

Assuming that the system's single sign-on policy can be adequately defined and supported by the authentication infrastructure, and that any necessary modifications can be made to applications and other resources in order to take advantage of the authentication services, the problem of system interoperability remains. For example, if a user of the system attempts to access an application on a separate system, the user may need to be authenticated again, even if the separate system has single sign-on capabilities of its own.

Focusing now on networked applications, such as web-based applications or other Internet or Intranet applications, the problems described above are magnified. Many networked applications require users to be authenticated, e.g. by entering a username and password on a login screen. As networked applications become increasingly interconnected, it becomes more desirable to enable single sign-on capabilities for them. For example, it may be desirable to enable a user of a web-based application to launch a second application, e.g., by clicking on a hypertext link, and have the second application launch immediately, bypassing an interactive authentication process that the user may normally have to perform when launching the second application.

Single sign-on approaches such as the ones described above may be unsuitable for integrating networked application authentication processes. For example, a developer of a networked application may wish to enable single sign-on to a large number of other networked applications, each of which may run on different systems. It may be impossible or infeasible to make the types of modifications described above to each system. Assuming this obstacle can be surmounted, other obstacles may remain, such as installing any necessary client software on each user's machine, defining the access rights of users who connect to a system via a network connection, etc. If a networked application were ported to a new system or a new server within a system, various steps in this process may have to be repeated.

What is needed instead is a specialized application-level method enabling single sign-on integration for networked applications. Such a single sign-on method would preferably be managed at the application level, would be independent of any particular computing platform or system-level authentication services, would be based on currently available, inexpensive technology standards in widespread use, and would require minimal modifications to current computer systems.

SUMMARY OF THE INVENTION

The present invention is directed toward single sign-on authentication for networked applications. Methods are described for enabling single sign-on both for applications that run in a single Internet domain and for applications implemented by multiple vendors which run in separate Internet domains. A system for integrating Internet-based applications via an application shell is described. In one embodiment, the application shell integrates healthcare-related applications.

In response to a user utilizing a client program to access a master server and provide the master server with information identifying the user, the master server returns code usable by the client program for running the application shell. The client program preferably comprises a web browser application or an application with web-browsing functionality, and the code returned by the master server preferably comprises standard elements interpretable by web browsers, such as markup language code, scripting code, etc. The application shell may be operable to intercept user attempts to launch an application from the application shell environment and may in response determine invocation parameters to send to the application, which the application can use to automatically authenticate the user.

In the preferred embodiment, the master server environment enables organization administrators to create user categories appropriate for their organizations and assign users affiliated with their organizations to these user categories. The user categories may correspond to job titles. For example, an administrator associated with a particular hospital may create user categories such as "Nurse", "Physician", etc. and may assign nurses, physicians, etc. associated with the hospital to their appropriate user categories. Organization administrators may also associate a particular set of healthcare applications with each user category, so that when each user logs on to the master server environment and receives the application shell code, the code is tailored to implement an application shell integrating an appropriate set of healthcare applications for the particular user.

In one embodiment, in addition to enabling single sign-on integration, the application shell also enables other types of application integration, such as context sharing integration and user interface integration. In the preferred embodiment, little or no modification to the applications themselves is necessary in order to achieve the application shell integration.

Administrators of the master server environment may provide application administrators with an administrative tool for configuring the master server environment with information necessary to achieve the single sign-on integration, such as application invocation parameters. One embodiment of an administrative tool and its interface to the master server environment is described below.

BRIEF DESCRIPTION OF THE DRAWINGS

A better understanding of the present invention can be obtained when the following detailed description of the preferred embodiment is considered in conjunction with the following drawings, in which:

FIGS. 5–6 illustrate a graphical user interface (GUI) for one embodiment of an administrative tool for configuring a master server environment with user and user category information;

FIG. 7 illustrates one embodiment of a personalization GUI for users to personalize the set of applications integrated into their application shells;

Figure 1A:
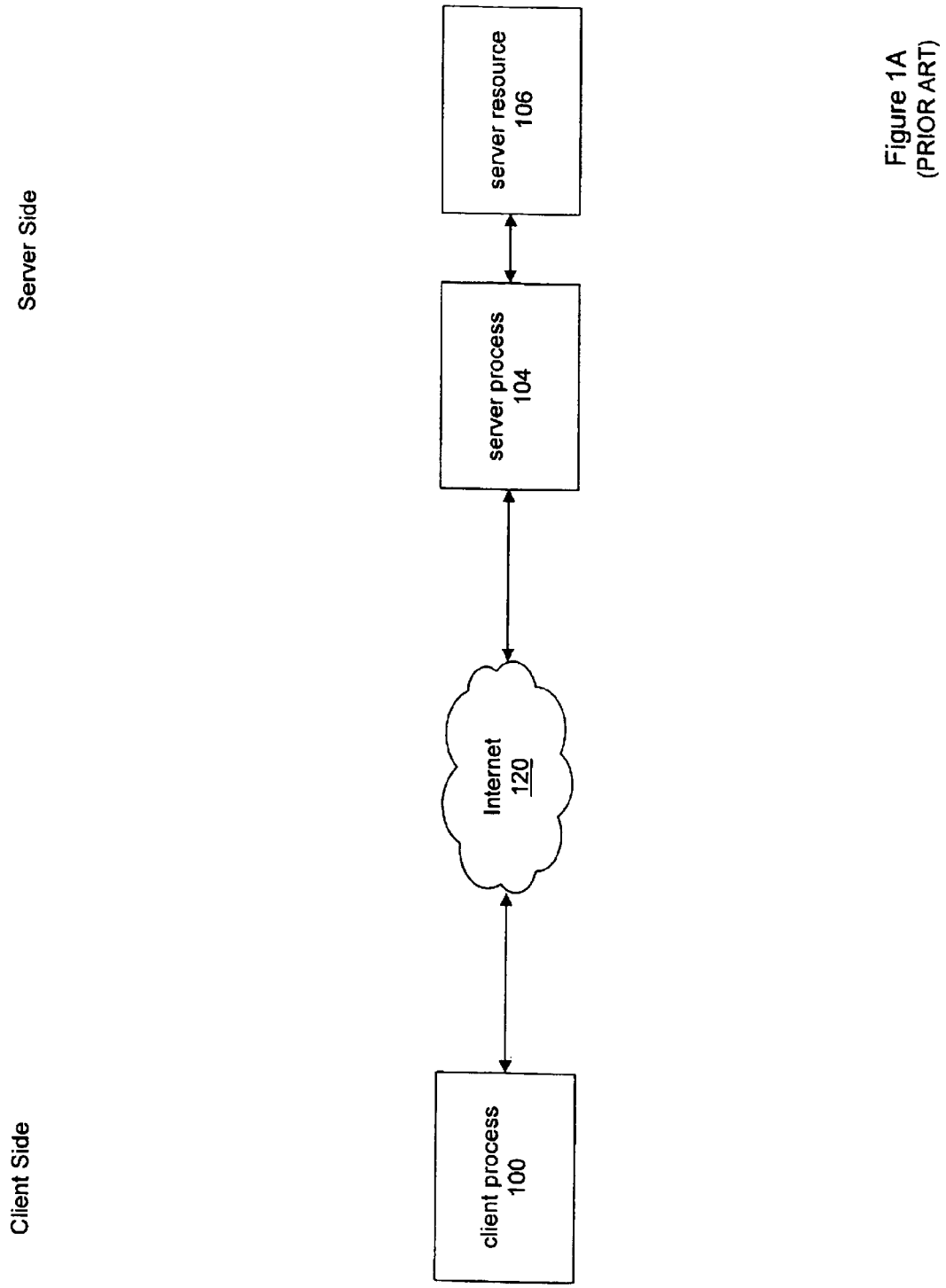
FIGS. 1A and 1B illustrate exemplary Internet-based applications.

While the invention is susceptible to various modifications and alternative forms specific embodiments are shown by way of example in the drawings and are herein described in detail. It should be understood however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE PREFERRED EMBODIMENT

Incorporation by Reference

The following reference is hereby incorporated by reference in its entirety as though fully and completely set forth herein:

U.S. patent application Ser. No. 09/626,338 titled "System and Method for Application Context Sharing among Internet-Based Healthcare Applications," filed Jul. 26, 2000, whose inventors were Marco Framba, David Duncan, Venkateshwar Talla, and Stephen Holland.

FIG. 1—Exemplary Networked Application

Figure 1B:
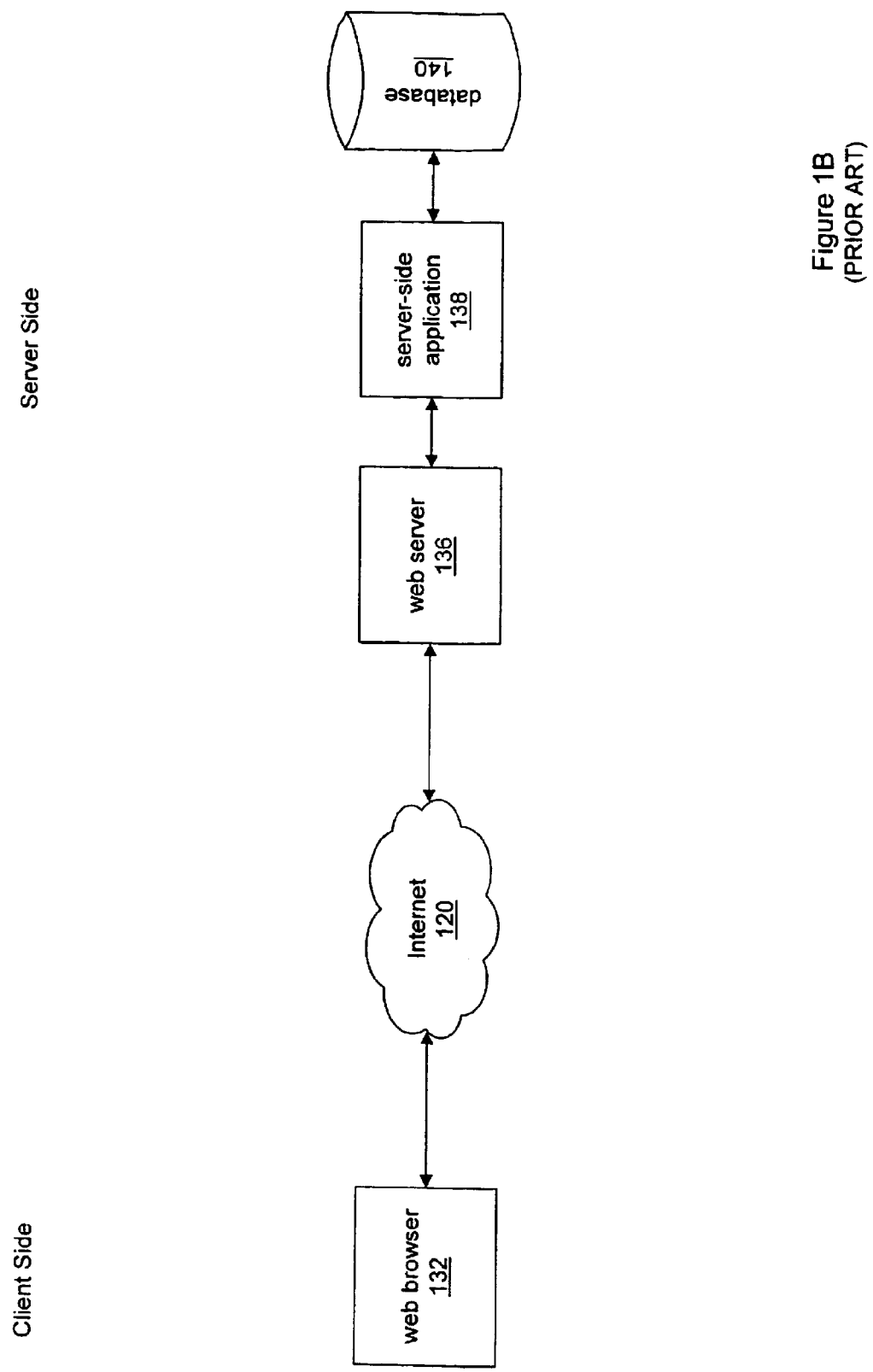

FIGS. 1A and 1B illustrate exemplary Internet-based applications. It is noted that FIGS. 1A and 1B represent particular embodiments of Internet-based applications, and various other embodiments are possible.

In FIG. 1A, the Internet-based application is illustrated as a client/server application with a client side and a server side. Client process 100 communicates with a server process 104 via the Internet 120. The client process 100 and the server process 104 may be associated with any type of application program or computing service. For example, a client process may communicate with a server process to perform a healthcare transaction, such as filing a health insurance claim. The server process 104 typically interacts with some type of server-side resource 106 on behalf of the client process. For example, the server process 104 may retrieve information from or store information to a server-side database 106.

The client process 100 may run in any type of client-side environment. For example, a client process may run in a desktop computer or workstation running any of various operating systems, such as Windows, Mac OS, Unix, etc., or a client process may run in a portable computing device, such as a personal data assistant, smart cellular phone, etc. Any number of clients may communicate with the server, depending on the type of application and the resources available to the server, such as network connection speed, processing power, etc.

The client may use a network connection as a communication channel to send requests and receive responses over the Internet 120. Various types of network protocols, including TCP/IP-based protocols and UDP-based protocols, e.g. HTTP, HTTPS, etc., may be used to send messages across the network. As messages are sent across the network, the messages may pass through various gateways, network routers, etc. The client network connection may be a connection of any type, such as a PPP or SLIP dialup link, an Ethernet or token ring connection, an ISDN connection, a cable modem connection, any of various types of wireless connections, etc.

Internet-based applications may be web-based applications or may include client-side web-browsing functionality. FIG. 1B illustrates one embodiment of a web-based application. There are, of course, many possible variations in web-based application architectures, and FIG. 1B is exemplary only. In general, a web-based application may be defined as an Internet-based application comprising a collection of resources that are accessible through uniform resource locators (URLs). The resources may include web pages comprising HTML, XML, scripting code such as Javascript or VBScript, or other types of elements. The resources may also include any of various types of executable programs or components, such as CGI programs, Java servlets, downloadable code such as Java classes or ActiveX components, etc. The resources may also include any other type of resource addressable through a URL. Web-based applications are often associated with particular communication protocols, such as HTTP or SSL. However, it is noted that any communication protocol may be used to access the resources.

As shown in FIG. 1B, the client-side of the web-based application may comprise a web browser 132, such as the Netscape Navigator or Microsoft Internet Explorer applications. It is noted that the web-browser 132 need not be a web browser per se, but may be any of various types of applications that include web-browsing functionality. For example, Microsoft Corp. provides programming interfaces enabling applications to include various web-browsing capabilities provided by the Microsoft Internet Explorer code base. Also, as noted above, a web-based application may comprise code resources packaged in various forms that operate under control of the web browser 132, such as Java applets or ActiveX components.

The web browser 132 may communicate across the Internet 120 with a web server 136, such as an HTTP server. Depending on the application and the resource requested, the web server 136 may broker client application requests to server-side application code 138 for processing, e.g., through interfaces such as CGI, ISAPI, NSAPI, etc. Server-side application code 138 may execute on one or more separate application servers and may interface with one or more server-side databases 140. It is noted that, in other embodiments, the web browser 132 may interface directly with server-side application code 138.

Figure 2:
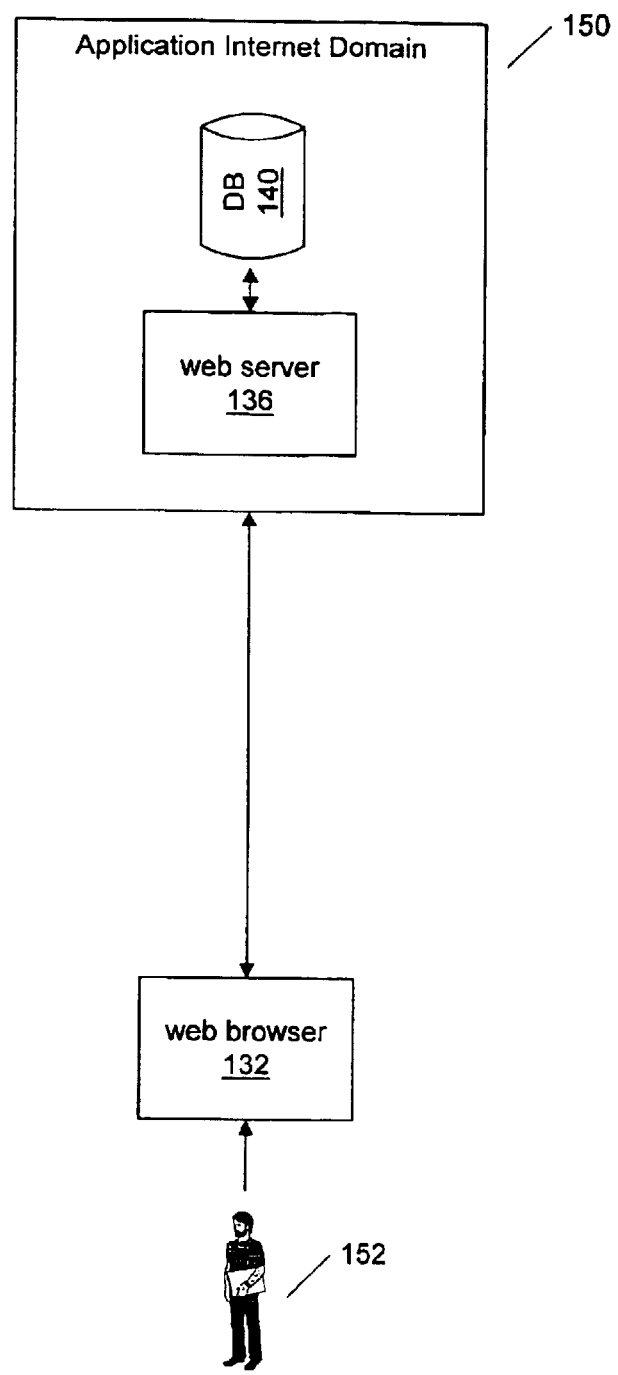
FIG. 2 illustrates a user interacting with a web-based application via a web browser.

FIG. 2—Exemplary Application Domain

FIG. 2 is a block diagram similar to FIG. 1. FIG. 2 illustrates a user 152 interacting with a web-based application via a web browser 132. The server side of the web-based application in FIG. 2 is illustrated in terms of the application's Internet domain 150. The embodiment of FIG. 2 illustrates the application associated with a single Internet domain. However, in other embodiments, the application may run across multiple domains. As discussed above with reference to FIG. 1, the user may provide URLs associated with the application to the web browser 132 in order to access various application resources. The web browser may then interface with a web server 136. The web server 136 may interface with a database 140 or with other types of server resources. As discussed above, the web server 136 may interface with an application server. Also, the web browser 132 may interface directly with an application server, without interfacing with a web server.

Figure 3:
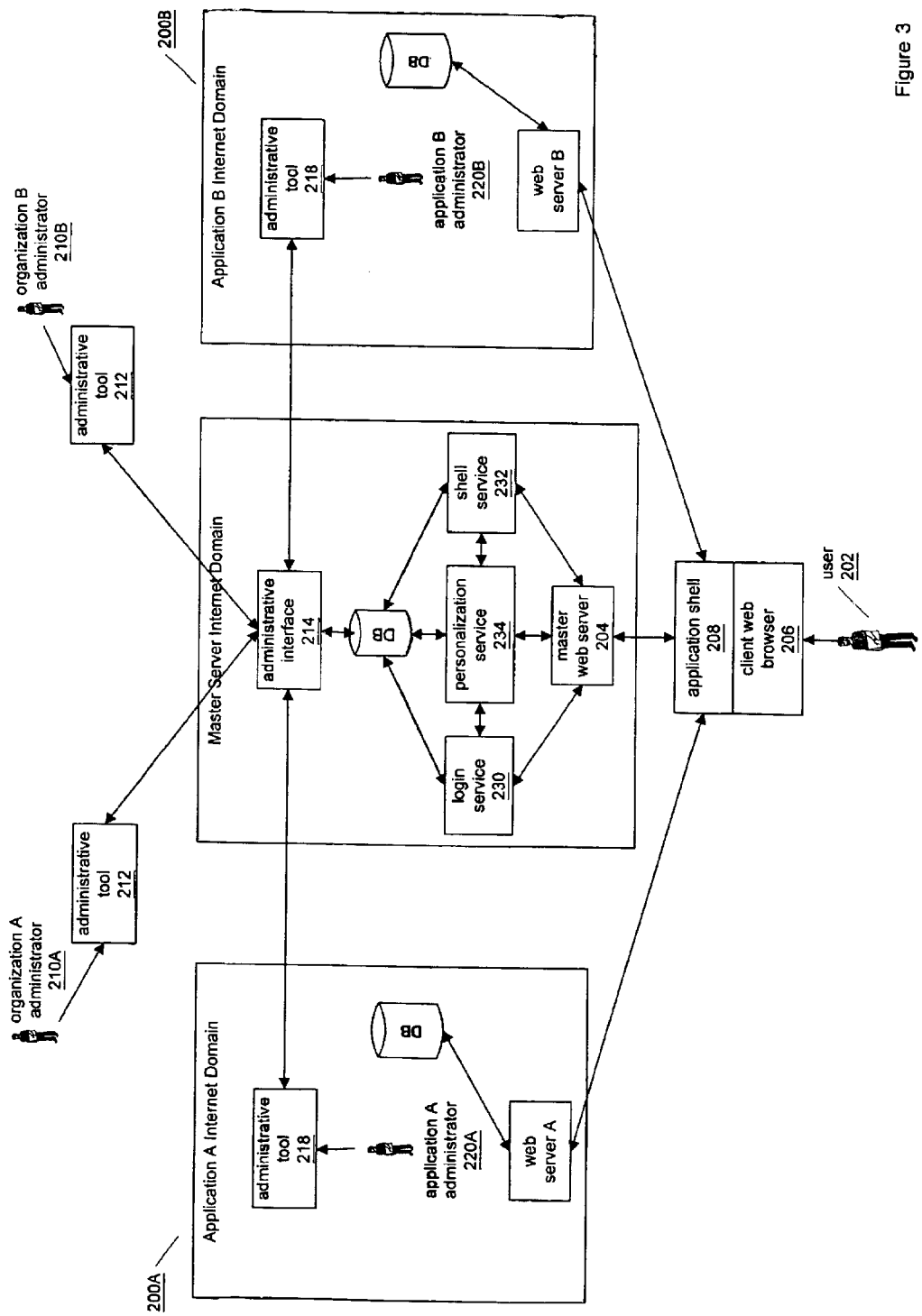
FIG. 3 is a block diagram illustrating one embodiment of a system for integrating Internet-based applications.

FIG. 3—System Enabling Context Sharing among Internet-Based Applications

FIG. 3 is a block diagram illustrating one embodiment of a system enabling single sign-on authentication for Internet-based applications. FIG. 3 illustrates exemplary application domains 200A and 200B, in which web-based applications A and B, respectively, run. It is possible that the applications A and B are enabled to allow access by a user 202 in an independent manner, as described above with reference to FIG. 2. The idea behind FIG. 3, however, is that the user first accesses a "master web server" 204. In response to the user accessing the master web server, the master web server returns information to the user's web browser 206, where the information is usable by the web browser to implement an "application shell" 208.

The application shell 208 provides a means for integrating independent applications into a single environment. One embodiment of an application shell and the integration it performs is described below. Although only two independent applications, applications A and B, are shown in FIG. 3, the system may integrate any number of web-based applications. As described below, when the user accesses the master web server 204, the user may provide user information, e.g. a username, which the master server may use to identify the user and return information to the web browser for implementing an application shell that integrates a particular set of web-based applications associated with the specific user.

As shown in the embodiment of FIG. 3, the master server environment may comprise various software services, such as a login service 230, a shell service 232, and a personalization service 234. One embodiment of these services is described below. The master server environment may also comprise other types of services. The services may be computing services implemented using any of various technologies or programming methodologies. For example, the services may comprise CORBA services, COM/DCOM services, Java services, etc.

As shown in FIG. 3, organization administrators 210 associated with particular organizations, e.g., an administrator for a particular hospital, may utilize an administrative tool 212 in order to update the master server environment.

The administrative tool 212 may interface with the master server environment via an administrative interface 214 exposed by the master server environment. The administrative tool 212 may be provided to organization administrators 210 by master server administrators. One embodiment of an administrative tool 212 and its interface to the master server environment are described below. Exemplary types of information which may be set via the administrative tool 212 are also described below. In particular, organization administrators 210 may create user categories, assign users affiliated with their organizations to these user categories, and associate a particular set of web-based applications with each user category.

FIG. 3 also illustrates means for performing other aspects of administration of the master server environment. As shown in FIG. 3, application administrators 220 of particular healthcare applications, e.g., an administrator for an application associated with performing laboratory tests, may utilize an administrative tool 218 in order to update the master server environment. Application administrators 220 may utilize the administrative tool 218 in order to specify integration information, such as single sign-on invocation parameters, for their particular applications. The administrative tool 218 may be provided to application administrators 220 by master server administrators and may interface with the master server environment via an administrative interface 214 exposed by the master server environment.

It is noted that, in some cases, a single administrator may perform both application administration and organization administration tasks. For example, an administrator associated with a particular hospital may be in charge of both maintaining user information for system users associated with the hospital, and maintaining application information, e.g., for an intra-hospital laboratory test application. Also, the functionality of administrative tools 212 and 218 may be incorporated into a single administrative tool.

The system illustrated in FIG. 3 may provide a means for linking various healthcare applications, such as applications for laboratory test administration, health insurance claim administration, hospital patient administration, etc. However, although the system is described in terms of the healthcare industry and healthcare applications, it is noted that the system may be used for integrating many other types of applications.

Figure 4:
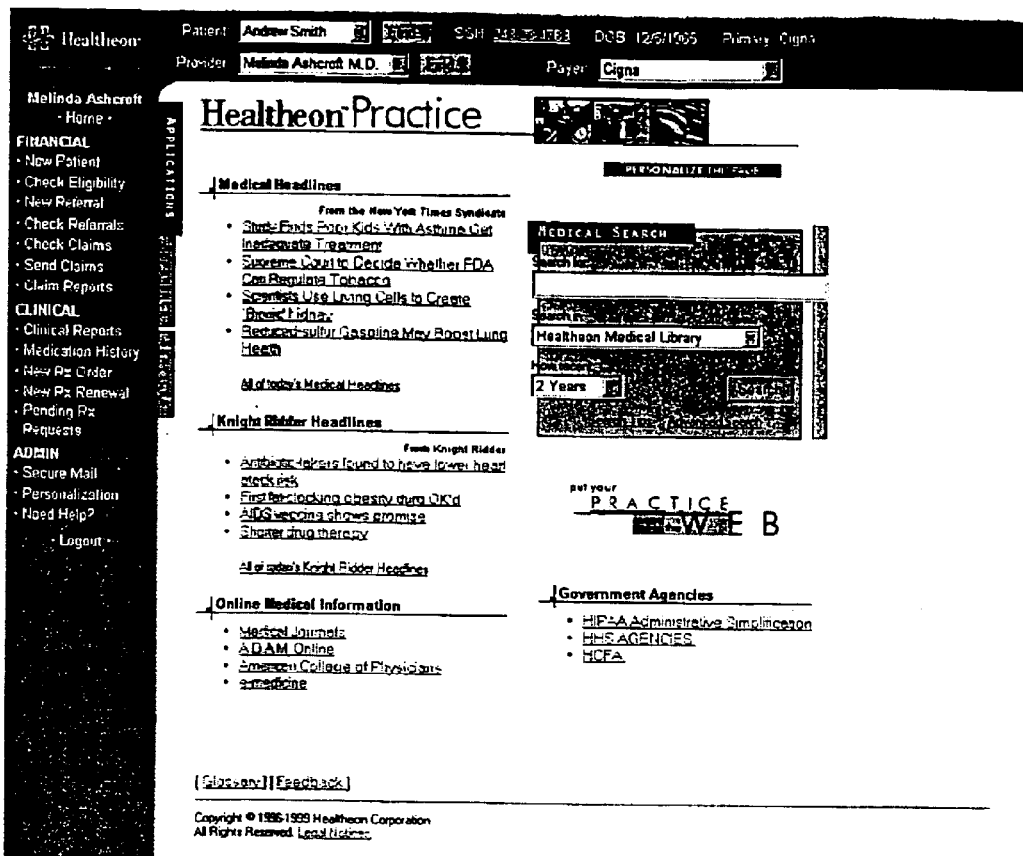
FIG. 4 illustrates a graphical user interface (GUI) for one embodiment of an application shell.

FIG. 4—Application Shell User Interface

FIG. 4 illustrates an exemplary graphical user interface (GUI) for one embodiment of an application shell. The application shell preferably runs within a web browser application, based on code, such as markup language code and scripting code, received from a master server, as described below.

FIG. 4 shows a navigation bar 300 along the left side of the screen. The navigation bar comprises hypertext links associated with various Internet-based healthcare applications. For example, the FIG. 4 applications include applications associated with health insurance administration, applications for viewing clinical reports, applications associated with prescription administration, etc. As shown in FIG. 4, the navigation bar may include selectable tabs 302 for logically grouping the set of applications that the application shell integrates. As described in detail below, the master server may provide specialized code to the web browser, enabling the web browser to implement an application shell tailored to the particular user or to a user category that the particular user belongs to. For example FIG. 4 illustrates an application shell GUI that integrates a typical set of healthcare applications that may be used by a nurse employed in a physicians' office. For other types of users, such as health insurance administrators, the delivered set of healthcare applications may differ.

The set of applications accessible via the navigation bar may include disparate types of healthcare-related applications, and these applications may be provided by multiple vendors and may run across multiple Internet domains. The application shell provides a means for integrating the set of applications, including single sign-on integration. The application shell may also provide a means for other types of application integration, as discussed below.

Figure 5:

FIGS. 5–6: User Administration

FIGS. 5–6 illustrate a graphical user interface (GUI) for one embodiment of an administrative tool for configuring the master server environment for delivering application shell information to users. As discussed above with reference to FIG. 3, an administrative tool for configuring the master server environment may be provided to organization administrators by master server administrators.

FIG. 5 illustrates one embodiment of a GUI for creating a user category, e.g. a job description, and associating a particular set of healthcare applications with the user category. Advantageously, each organization administrator may associate applications with user categories as appropriate for his particular organization. For example, many separate healthcare organizations may employ users with a job title of "nurse". However, the role of a nurse may differ significantly across different organizations. Thus, it is desirable for each organization administrator to be able to create a "nurse" user category for nurses in his particular organization and to assign the appropriate set of healthcare applications to the nurse user category.

FIG. 6 illustrates one embodiment of a GUI for adding a new user. As shown, the GUI may include fields for specifying personal information, such as the user's name, email address, etc. A username may be assigned to uniquely identify the user. The GUI preferably also includes a field for choosing a user category for the user. In the FIG. 6 example, the "Job" field is used to assign the user to a user category.

Application Administration

As discussed above, administrators of the master server may provide application administrators with an administrative tool for configuring the master server environment with application information. This section a graphical user interface (GUI) for one embodiment of an administrative tool for performing this configuration. The administrative tool GUI may comprise a name field for specifying a name for the application. The name specified may appear in the user's application shell GUI on the navigation bar. For example, one of the application names in the FIG. 4 application shell GUI is "Clinical Reports". The administrative tool GUI may also comprise a field for specifying a location of an icon associated with the application that should be displayed in the application shell GUI.

The administrative tool GUI may also comprise fields for specifying where the application name should appear in the application shell GUI. For example, in one embodiment, the application shell GUI comprises a navigation bar, as described above, and a toolbar, which may appear above the main window or frame. The administrator may specify whether the application name should appear on the navigation bar or the toolbar. Applications appearing on the navigation bar may be grouped into sets of related applications. For example, the FIG. 4 navigation bar shows "Financial", "Clinical", and "Admin" groups. The administrative tool GUI may comprise fields for selecting the appropriate group for the application, or adding or deleting groups.

The administrative tool GUI may also comprise a URL field for specifying a uniform resource locator (URL) for launching the application. Applications to be integrated into an application shell may be provided by various vendors and may run in any location accessible via a URL.

The administrative tool GUI may also comprise fields for specifying windowing behavior in the application shell GUI. For example, the GUI may comprise a window field for specifying whether the application should be launched in a separate window when it is invoked by a user, or whether it should replace the main application shell GUI window or frame.

The administrative tool GUI may also comprise various fields for specifying options related to application single sign-on integration or other types of application integration, such as context sharing integration. For example, an invocation parameters field may be used to specify values to pass to the application when the application is invoked. An invocation type field may be used to specify the method for invoking the application and passing invocation parameters, e.g., via an HTTP GET or an HTTP POST operation, etc. Encryption fields may specify whether information passed to the application should be encrypted, and which encryption method to use. Invocation parameters are discussed in more detail below.

As described below, users may personalize their application shell GUI by specifying the applications they want to appear on the GUI. The administrative tool GUI may comprise an allow suppression field for specifying whether users are allowed to suppress the appearance of the application name.

The administrative tool is described above in terms of its use by administrators associated with particular applications. However, administrators of the master server environment may also, of course, utilize such an administration tool for configuring application information. Also, as previously noted, an administrator may perform both organization administration and application administration functions.

FIG. 7—User Personalization

As discussed above, organization administrators may create user categories, associate a set of applications with the user categories, and assign members of their organizations to the user categories. Means for users to further refine the set of applications delivered to their application shells may also be included. In the preferred embodiment, this means comprises a personalization GUI accessible via the application shell GUI. For example, FIG. 4 shows a "Personalization" hypertext link on the application shell GUI navigation bar. FIG. 7 illustrates one embodiment of a personalization GUI. As shown, the personalization GUI may comprise a field for specifying a particular application group. Once the group has been selected, a list of applications associated with the group may be displayed, and the user may select which applications he wants to appear in the application shell GUI. As noted above, some applications may be configured to be insuppressible.

As described below, the master server may access the user's personalization information set via the FIG. 7 GUI when the master server returns the application shell information to the user's web browser.

Figure 8:
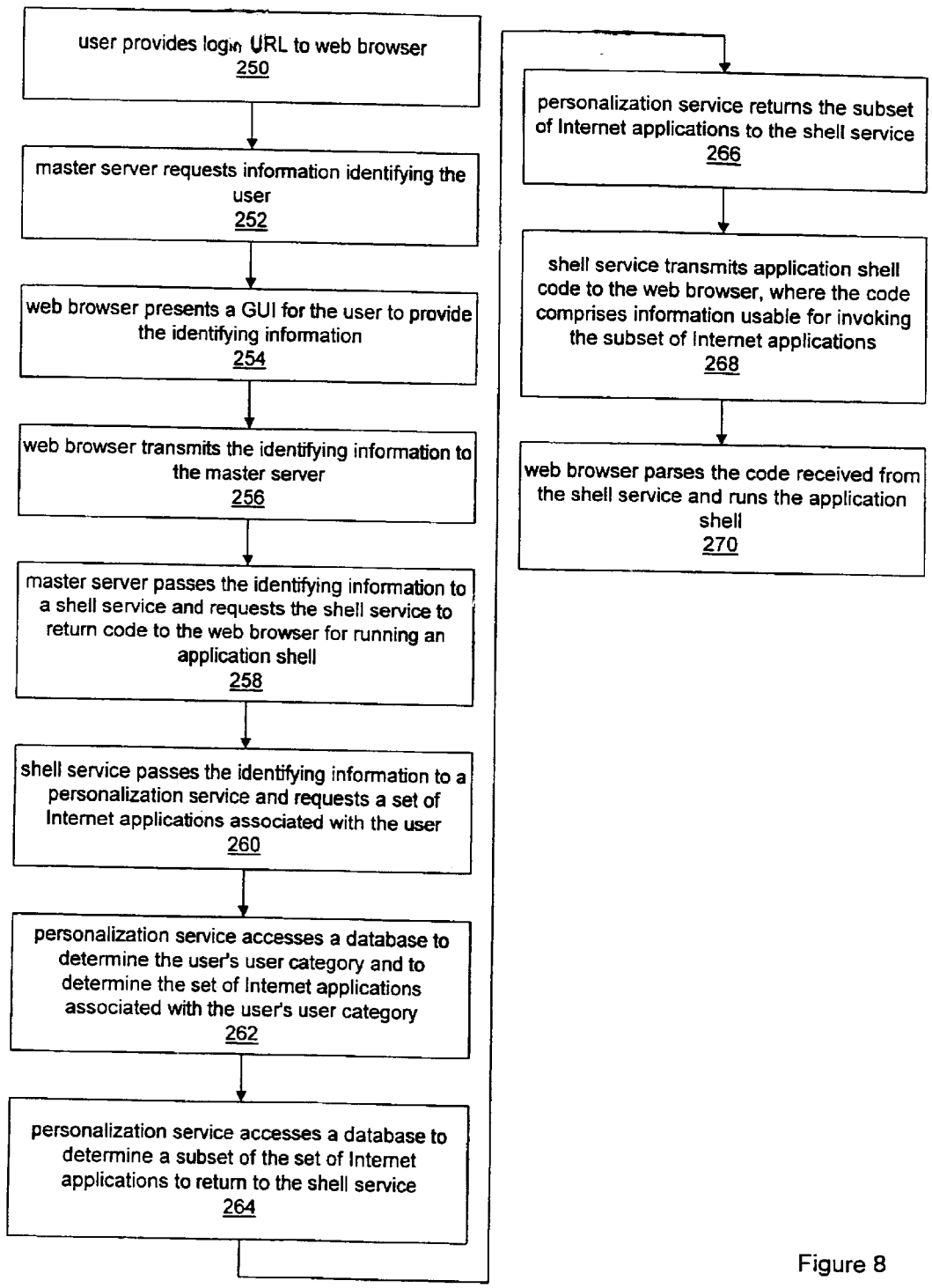
FIG. 8 is a flowchart diagram illustrating one embodiment of a user accessing a master server environment and receiving code, for an application shell.

FIG. 8—Returning Application Shell Information to Web Browser

FIG. 8 is a flowchart diagram illustrating one embodiment of a user accessing the master server environment and receiving code for an application shell.

In step 250 of FIG. 8, a user provides a URL associated with the master server environment to a web browser, and the web browser establishes communication with the master server, e.g., by interfacing with a login service. For example, the URL may reference a master server login web page. In step 252 of FIG. 8, the master server login service requests information identifying the user. For example, the login service may request a username, an email address, or other information that may be used in identifying the user. In step 254 of FIG. 8, the web browser presents a graphical user interface (GUI) for the user to provide the identifying information to the master server. Steps 252 and 254 may be accomplished in various ways, e.g., by the login service using standard methods causing the web browser to present a login dialog box to the user, or by the login service returning an HTML login form which the web browser then displays, etc. In step 256 the web browser transmits the identifying information provided by the user to the master server login service.

In step 258 of FIG. 8, the master server login service receives the identifying information from the web browser. The login service passes the identifying information to a shell service running in the master server environment and requests the shell service to return code to the web browser for running an appropriate application shell for the user. The login service may, of course, authenticate the user or interface with an authentication service before contacting the shell service.

In step 260 of FIG. 8, the shell service passes the identifying information to a personalization service running in the master server environment and requests the personalization service to return a set of applications, e.g. a list of application URLs, associated with the user.

As discussed above, an organization administrator for the user's organization, e.g., a computer administrator for the user's employer, may create user categories, e.g., categories based on particular job titles used in the organization, and may associate a particular set of applications with the user categories, and may assign each user affiliated with the organization to a user category. In step 262 of FIG. 8, the personalization service uses the identifying information received from the shell service to determine the user category that the user is assigned to, e.g., by accessing a database that stores this information. The personalization service also determines the set of applications associated with the user's user category, e.g., by accessing a database that stores this information.

As discussed above, a user may have previously utilized a personalization GUI associated with the master server environment, in order to specify particular applications from the set of applications associated with the user's user category that the user does not want to be integrated into the user's application shell GUI. In step 264 of FIG. 8, the personalization service may access this personalization information for the user, e.g., by accessing a database that stores this information, in order to determine a subset of the set of applications that should be returned to the shell service.

In step 266 of FIG. 8, the personalization service returns the subset of applications to the shell service, e.g. by returning a list of URLs associated with each application, or by returning keys that the shell service may use to identify the applications.

In step 268 of FIG. 8, the shell service transmits application shell code to the web browser, where the application shell code comprises information usable by the web browser for displaying a GUI enabling the user to invoke the applications returned by the personalization service. In one embodiment, the application shell code comprises standard elements interpretable by web browser applications, such as markup language code, e.g., HTML code or code for XML-derived markup languages, along with other standard elements, such as scripting code, e.g. Javascript, VBScript, etc.

In step 270 of FIG. 8, the web browser parses the application shell code from the shell service and runs the application shell, preferably using common web browser standards.

Figure 9:
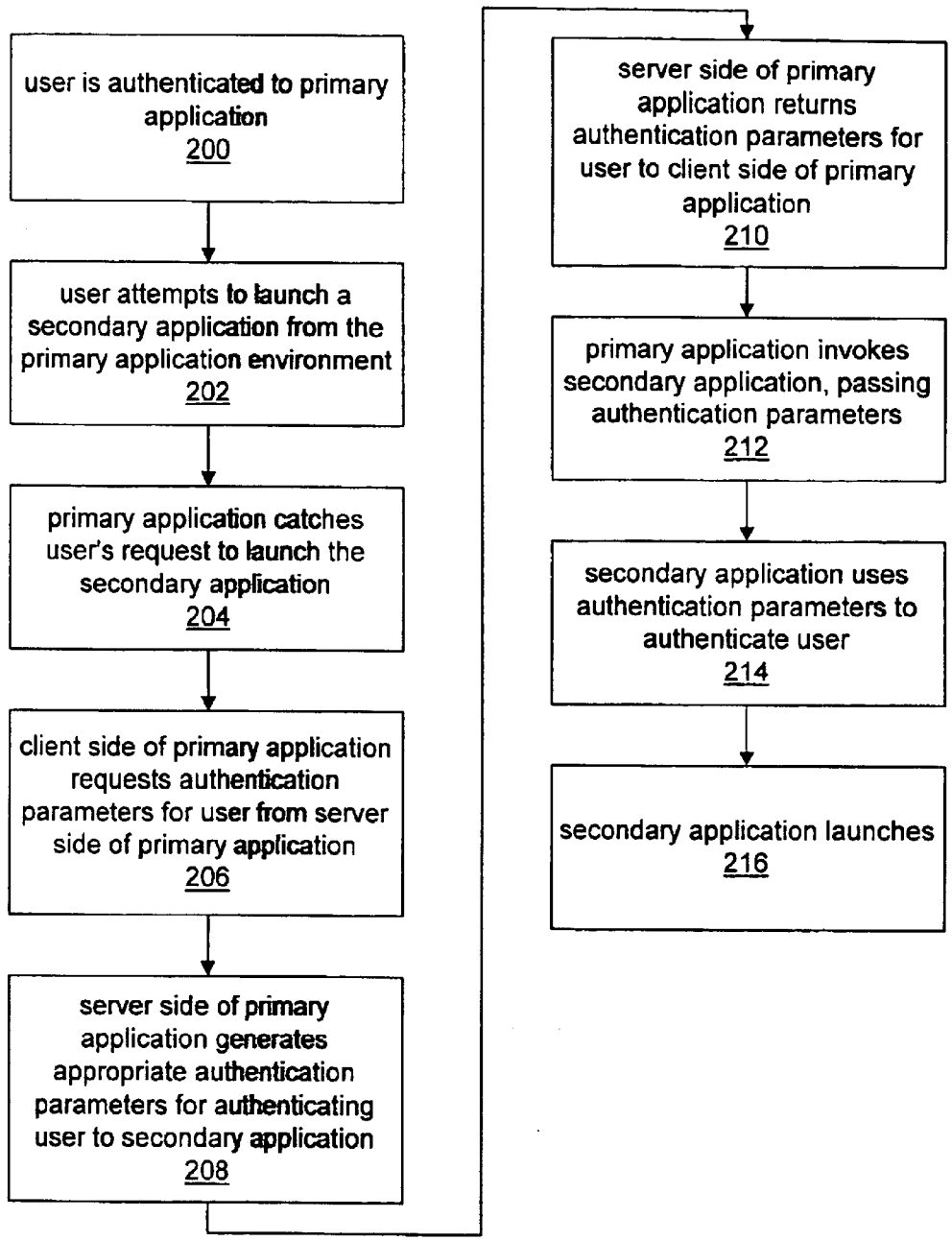
FIG. 9 is a flowchart diagram illustrating one embodiment of a method for performing single sign-on authentication for Internet-based applications.

FIG. 9—Single Sign-On Method for Networked Applications

FIG. 9 is a flowchart diagram illustrating a single sign-on method for networked applications. For the sake of clarity, the "first" networked application which the user interacts with in order to authenticate himself is referred to as the primary application. Any applications which the user then launches from the environment of the primary application, and which the user is transparently authenticated against, are referred to as secondary applications. In one embodiment, the primary application may be an application shell such as described above. It is noted, however, that the method shown in FIG. 9 may also be applied for various other types of systems and applications.

In step 200, the user is authenticated to a primary application. For example, when the user tries to access the primary application, the application may initiate a login process requiring the user to provide information such as a password, or biological or other personal information, etc. After providing this information, the client side and the server side of the primary application may perform an authentication process using any of various authentication methods, such as cleartext methods, hashed password methods, challenge-response methods, etc. Upon successful completion of this authentication procedure, the client side may receive some type of token from the server side, indicating that the user has been authenticated and authorized to use the primary application. For example, for a web-based primary application, this token may be a cookie sent to the client side.

In step 202, the user attempts to launch a secondary application from the environment of the primary application. The user may attempt to launch the secondary application using any method supported by the primary application. For example, the user may attempt to launch a secondary application in a web browser window or frame, e.g., by clicking on a hypertext link displayed by the primary application or executing a menu command in the primary application, etc., or the user may attempt to launch a secondary application running in a customized window, e.g., by executing a menu command in the primary application or by operating an ActiveX control from a browser window displaying the primary application, etc. As noted, in one embodiment, the primary application may be an application shell, and the secondary application shell may be an application that the application shell integrates with other applications via its graphical user interface.

In step 204, the primary application intercepts the user's request to launch the secondary application. The primary application may intercept this request in various ways, as appropriate to the application environment. For example, the primary application may register an event handler, such as a Javascript OnClick event handler, to catch a click on a hypertext link associated with the secondary application, or the primary application may register a menu item event handler to catch a menu command to launch the secondary application, etc.

In step 206, the client side of the primary application requests appropriate authentication parameters for the user from the server side of the primary application. This request may be sent using any of various protocols, such as HTTP, SSL, other TCP/IP-based protocols, etc.

In step 208, the server side of the primary application generates appropriate authentication parameters which can be used to authenticate the user to the secondary application. For each user, the server side of the primary application preferably maintains persistent information, e.g., information stored in a database, which can be used to determine the appropriate authentication parameters to use for each of the various secondary applications that the user may launch from the primary application. This information may be set in various ways. For example, the information may be set programmatically as part of a user registration process, or the information may be set interactively through an administrative tool. One embodiment of an administrative tool that allows administrators of secondary applications to set up the appropriate authentication parameter information for each secondary application user is described below. The authentication parameter information may be stored in an encrypted form.

The nature of the stored authentication parameter information may vary. For example, the information may comprise a string, numerical data, or any other type of data. What is important is that the stored authentication parameter information can be used to generate valid authentication parameters that the secondary application accepts as valid authentication information for the user. In the preferred embodiment, these authentication parameters are generated by applying a cryptographic technique to the stored authentication parameter information. Any of various cryptographic techniques may be applied, including symmetric encryption algorithms, such as DES or Triple-DES, asymmetric encryption algorithms, such as the RSA system, etc. The primary application preferably supports multiple cryptographic techniques and allows administrators of secondary applications to select which technique(s), if any, to use in generating the authentication parameters. For example, secondary administrators may select which technique to use via an administrative tool GUI.

The authentication parameters generated by the server side of the primary application may also include other information besides the authentication parameters described above. For example, the authentication parameters may include a montonically increasing sequence number. Such a sequence number may be used, for example, if the client side of the primary application keeps a history list, such as the history list kept by many web browsers. As described below, the sequence number may be checked by the secondary application in order to prevent the user from accessing the secondary application again using the history list. The generated authentication parameters may also include an expiry time for the authentication parameters, or any other desired or necessary information.

Once the authentication parameters for the user have been generated, the server side of the primary application returns them to the client side of the primary application in step 210. The parameters may be returned using any of various protocols, such as HTTP, SSL, other TCP/IP-based protocols, etc.

In step 212, the client side of the primary application uses the authentication parameters to invoke the secondary application. The secondary application may be invoked in various ways, as appropriate for the environment of the primary application, and as supported by the secondary application. The primary application preferably invokes the secondary application by contacting the server side of the secondary application, passing along the user's authentication parameters. For example, in step 202, if the user requested that the secondary application be launched by clicking on a hypertext link, then, as described above, an event handler, such as a Javascript event handler may catch the request and contact the server side of the primary application to obtain the appropriate authentication parameters. In this example, the event handler may then invoke the secondary application by invoking a URL associated with the link the user clicked on. The authentication parameters may be provided along with the URL, e.g. by appending them as a query string to the URL and performing an HTTP GET operation, or by placing them in an HTML form and performing an HTTP POST operation, etc. For other types of primary or secondary applications, the invocation may occur in other ways. For example, the primary application may contact a client-side program associated with the secondary application, passing the client side of the secondary application the authentication parameters, e.g., as command line arguments. The client-side of the secondary application may then be operable to contact the server side of the secondary application, in order to begin the authentication process for the secondary application.

In step 214, the server side of the secondary application uses the authentication parameters received in step 212 to attempt to authenticate the user. The secondary application should be configured to use the appropriate techniques for properly decoding the authentication parameters, if any cryptographic techniques were applied in step 208. The secondary application may perform additional operations or checks on the authentication parameters. For example, if the authentication parameters include an expiry time, the secondary application may ensure that the parameters are still valid. If the authentication parameters include a monotonically increasing sequence number, the secondary application may enforce this sequence number.

Once the authentication parameters have been decoded and possibly checked for a valid expiry time, sequence number, etc., the secondary application may use them to attempt to authenticate the user. As described above, the nature of the authentication parameter information stored by the server side of the primary application may vary, possibly comprising data of any kind. The nature of the authentication parameters received by the server side of the secondary application may thus vary also. The secondary application may thus perform any type of operation or processing on the authentication parameters that is necessary to authenticate the user.

Assuming that the secondary application was able to successfully authenticate the user in step 214, the secondary application is launched in step 216. The actions involved in launching the secondary application may vary for different types of primary and secondary applications. For example, if the secondary application uses web pages, then the server side of the secondary application may return an initial web page for the secondary application. This initial web page may then be displayed in a frame, such as an HTML frame, alongside frames associated with the primary application, or may be displayed in a separate window. If necessary, a client-side program, such as a web browser program, may be invoked in order to display a web page for the secondary application. For other types of secondary applications, other types of client-side programs associated with the secondary application may be launched. For example, if the secondary application is a game application requiring a special client-side program, then this client-side program may launch.

If the secondary application cannot authenticate the user in step 214, then the secondary application may notify the user with an error message. The secondary application may also present an explicit authentication mechanism, such as a login screen, to the user. The secondary application may also alert the administrators of the secondary application that the single sign-on failed for the user, e.g. by sending an email message. A secondary application administrator may then update the information stored on the server side of the primary application so that future single sign-on attempts by the user will succeed.

Context Sharing Integration

As noted above, in one embodiment the application shell may also be operable to enable application context sharing for the applications integrated by the application shell. Application context sharing refers to the transparent sharing of application context as a user switches between applications. For example, a physician may be interacting with a patient administration application, viewing information about a patient named "John Doe". The physician may then desire to switch to another application. For example, the physician may want to switch to an application allowing him to see laboratory test results for John Doe. Normally, this would require the physician to manually set the application context in the second application, e.g., by performing a search operation for "John Doe". The idea behind application context sharing, however, is that the application context for the second application is set automatically in response to the user invoking the second application. In this case, for example, the laboratory test application may automatically show the physician John Doe's laboratory records. For example, the application shell may be operable to pass context sharing invocation parameters to the applications, similarly as described above for passing context parameters. One embodiment of a system and method for enabling this context sharing capability is described in the above-incorporated U.S. patent application titled, "System and Method for Application Context Sharing among Internet-Based Healthcare Applications".

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for automatically authenticating a user of a first networked application to a second networked application, the method comprising:

the first networked application receiving authentication information from the user;

the first networked application authenticating the user to use the first networked application in response to said receiving the authentication information from the user;

launching the second networked application from within the first networked application, wherein said launching comprises the first networked application providing authentication information associated with the user to the second networked application;

the second networked application authenticating the user to use the second networked application in response to receiving said authentication information from the first networked application.

2. The method of claim 1, wherein said launching the second networked application comprises the user performing an action which triggers a programmatic event, the method further comprising:

the first networked application intercepting the event;

the first networked application providing authentication information associated with the user to the second networked application, in response to said first networked application intercepting the event.

3. The method of claim 2, wherein said launching the second networked application comprises the user clicking on a hypertext link associated with the second application;

wherein said user clicking on the hypertext link triggers a programmatic event representing the click;

wherein the first networked application includes an event handler which intercepts the click event.

4. The method of claim 3, wherein the event handler is a Javascript event handler.

5. The method of claim 1, wherein said first networked application providing authentication information associated with the user to the second networked application comprises:

a client side of the first networked application requesting and receiving authentication parameters from a server side of the first networked application, wherein the authentication parameters comprise information for authenticating the user to the second networked application;

the client side of the first networked application providing the authentication parameters to the server side of the second networked application.

6. The method of claim 5, wherein said launching the second networked application comprises the user clicking on a hypertext link associated with the second application;

wherein the first application includes an event handler that intercepts an event triggered by the user clicking on the hypertext link;

wherein the event handler requests and receives authentication parameters from the server side of the first application, wherein the authentication parameters comprise information for authenticating the user to the second networked application;

wherein the event handler passes the authentication parameters to the server side of the second networked application.

7. The method of claim 6, wherein said event handler passing the authentication parameters to the server side of the second networked application comprises the event handler appending the authentication parameters onto a URL associated with the second networked application;

wherein the event handler performs an HTTP GET request using the resulting URL.

8. The method of claim 6, wherein said event handler passing the authentication parameters to the server side of the second networked application comprises the event handler performing an HTTP POST request using a URL associated with the second application;

wherein the authentication parameters are sent to the server side of the second networked application as posted data.

9. The method of claim 5, wherein the server side of the first networked application stores information associated with the user in a database;

wherein the stored user information is used to generate the authentication parameters.

10. The method of claim 9, wherein the user information stored by the server side of the first networked application was previously set by an administrator of the second networked application using an administrative tool.

11. The method of claim 5, wherein the authentication parameters received from the server side of the first networked application are encrypted.

12. The method of claim 11, wherein the server side of the first networked application is enabled to apply various cryptographic techniques to the authentication parameters;

wherein an administrator may specify which techniques to apply using an administrative tool.

13. The method of claim 11, wherein the authentication parameters include a sequence number.

14. The method of claim 11, wherein the authentication parameters include an expiry time.

15. The method of claim 5, wherein the client-side of the first networked application comprises an application having web-browsing functionality.

16. The method of claim 1, further comprising: the second networked application launching after said second networked application authenticating the user to use the second networked application.

17. The method of claim 16, wherein the second networked application is a web application;

wherein said second networked application launching comprises the server side of the second networked application returning an initial web page to the client side of the second networked application.

18. A system for performing single sign-on user authentication, the system comprising:

a first computer system running client-side software associated with a first networked application;

a second computer system connected to the first computer system via a network, wherein server-side software associated with the first networked application runs on the second computer system;

a third computer system connected to the first computer system via a network, wherein server-side software associated with a second networked application runs on the third computer system;

wherein the client-side software associated with the first networked application is operable to:

receive authentication information from a user;

communicate with the server-side software associated with the first networked application in order to authenticate the user to use the first networked application, in response to said receiving the authentication information from the user;

launch the second networked application from within the first networked application, wherein said launching comprises providing authentication information associated with the user to the server-side software associated with the second networked application;

wherein the server-side software associated with the second networked application is operable to authenticate the user to use the second networked application, in response to receiving said authentication information from the client-side software associated with the first networked application.

19. The system of claim 18, wherein said launching the second networked application is performed in response to intercepting a programmatic event triggered by the user requesting to launch the second networked application.

20. The system of claim 18, wherein said launching the second networked application is performed in response to intercepting a programmatic event triggered by the user clicking on a hypertext link associated with the second application;

wherein the client-side software associated with the first networked application includes an event handler which intercepts the click event.

21. The system of claim 20, wherein the event handler is a Javascript event handler.

22. The system of claim 18, wherein said providing authentication information associated with the user to the server-side software associated with the second networked application comprises:

requesting and receiving authentication parameters from the server-side software associated with the first networked application, wherein the authentication parameters comprise information for authenticating the user to the second networked application;

providing the authentication parameters to the server-side software associated with the second networked application.

23. The system of claim 22, wherein said launching the second networked application is performed in response to the user clicking on a hypertext link associated with the second application;

wherein the client-side software associated with the first networked application includes an event handler that intercepts an event triggered by the user clicking on the hypertext link;

wherein the event handler requests and receives authentication parameters from the server-side software associated with the first networked application, wherein the authentication parameters comprise information for authenticating the user to the second networked application;

wherein the event handler passes the authentication parameters to the server-side software associated with the second networked application.

24. The system of claim 23, wherein said event handler passing the authentication parameters to the server-side software associated with the second networked application comprises the event handler appending the authentication parameters onto a URL associated with the second networked application;

wherein the event handler performs an HTTP GET request using the resulting URL.

25. The system of claim 23, wherein said event handler passing the authentication parameters to the server-side software associated with the second networked application comprises the event handler performing an HTTP POST request using a URL associated with the second networked application;

wherein the authentication parameters are sent to the server-side software associated with the second networked application as posted data.

26. The system of claim 22, wherein the server-side software associated with the first networked application stores information associated with the user in a database;

wherein the stored user information is used to generate the authentication parameters.

27. The system of claim 26, wherein the user information stored by the server-side software associated with the first networked application was previously set by an administrator of the second networked application using an administrative tool.

28. The system of claim 22, wherein the authentication parameters received from the server-side software associated with the first networked application are encrypted.

29. The system of claim 28, wherein the server-side software associated with the first networked application is enabled to apply various cryptographic techniques to the authentication parameters;

wherein an administrator may specify which techniques to apply using an administrative tool.

30. The system of claim 18, wherein the client-side software associated with the first networked application comprises an application including web-browsing functionality.

* * * * *